United States Patent Office 3,304,694
Patented Feb. 21, 1967

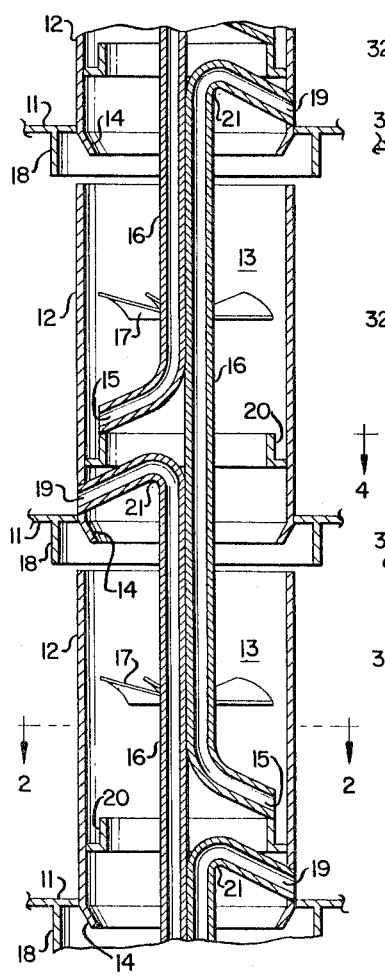
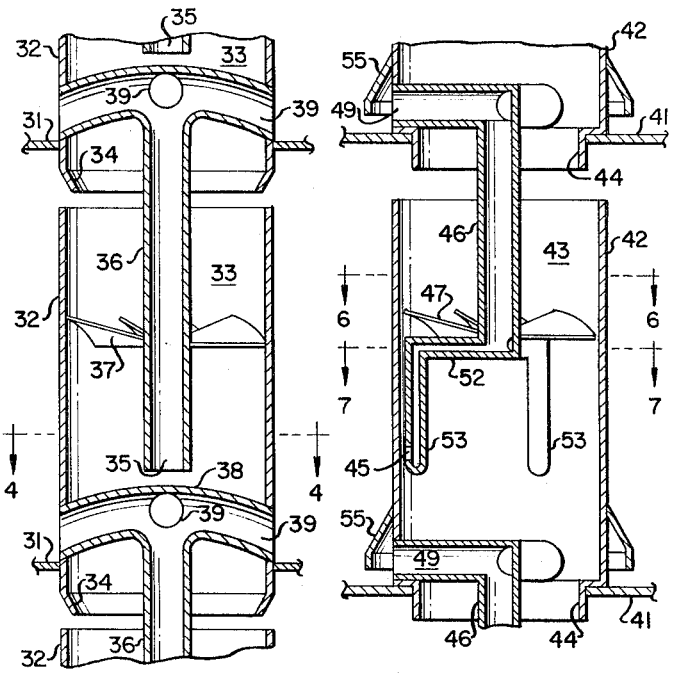
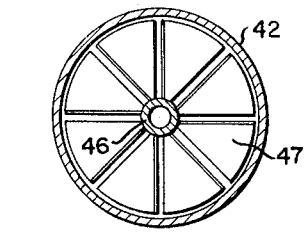
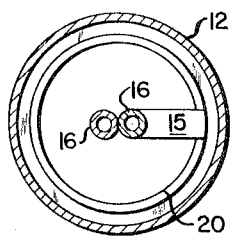
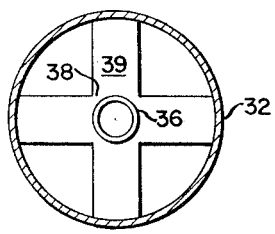
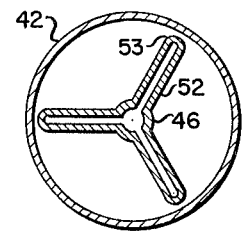

3,304,694
GAS-LIQUID CONTACTOR WITH CENTRAL
SUPPLY CONDUIT
Willem H. Manger and Hendrik Verburg, Amsterdam,
Netherlands, assignors to Shell Oil Company, New
York, N.Y., a corporation of Delaware
Filed Oct. 22, 1964, Ser. No. 405,696
Claims priority, application Netherlands, Oct. 30, 1963,
299,913
4 Claims. (Cl. 55—238)

This invention relates to apparatus for contacting liquids and gases, which apparatus comprises a contacting chamber enclosed by a tubular wall through which the gas and liquid move concurrently in an upward or downward direction, the said chamber having gas and liquid inlets at one end and gas and liquid outlets at the other. Several contacting units of such construction can be combined to effect an over-all countercurrent flow between the liquid and gas.

The term "gas" is herein used generically to include vapor.

In industry, as, for instance, in distilling in oil refineries, very large quantities of fluids are often involved in the gas-liquid exchange processes. In these cases the use of tubular contacting apparatuses as described above is very attractive, because high gas rates can be applied. In relation to the design of a plant of this type it is of great importance to aim at a minimum volume for the entire plant, because the cost of construction very much increases with increasing volume of the plant, mainly as a result of the heavier column and foundation required. It is well understood by those skilled in the art that to attain a given separating efficiency the length of the tubular chamber of a large diameter will have to be longer than the length of a tubular chamber of a small diameter. Owing to this it is desirable to make use of a plurality of tubular contacting units of small diameters rather than of a single contacting unit of a large diameter. If, now, a plurality of small tubular chambers are placed next to each other on a tray, the same quantity of distillation product of the desired quality can be produced in chambers having a much smaller height than would be possible through the use of a single tubular chamber of much larger diameter.

In this connection it is important to put the tubular chambers on the tray as near as possible to each other. This makes special demands on the construction of the means for the supply and discharge of liquid for each tubular chamber. These means for the supply and discharge should preferably make it possible for two or more trays to be placed above each other because generally, for example in distillation, the process of exchange between gas and liquid must take place in several steps to enable the desired separation to be achieved. This invention provides the means by which these requirements can be met in a simple way.

In one aspect, the invention comprises a gas-liquid contacting device wherein each tubular contacting apparatus is provided with an outer enveloping tubular wall defining a chamber, said chamber containing a centrally located vertically extending conduit for supplying liquid to said chamber. At the discharge end of the tubular contacting apparatus the liquid that has been separated from the gas stream is caught on all sides of the stream and passed into the space located outside the tubular wall.

It is advantageous to have the liquid supply conduit, which is located inside the tubular chamber, discharge into an annular drain mounted along the inner wall of the chamber. In this manner, an upward flow of gas will distribute the liquid flowing over the brim of the annular drain and thereby contribute to the atomization process. Alternatively, the supply conduit may terminate in a plurality of radially extending nozzles or spray openings, or the liquid may fall down onto a small panel mounted a small distance below the discharge opening of the supply conduit.

In another aspect, the invention provides a column for the countercurrent contacting of gas and liquid wherein the column contains a plurality of horizontal trays mounted at vertically spaced locations and each having a plurality of openings, and each tray carries, mounted at one of said openings, a tubular contacting unit through which gas and liquid flow concurrently, and having passageways for transferring the gas and liquid so that both the gas and the liquid traverse in succession a tubular contacting unit on each tray; the sequence of units being opposite so that overall countercurrent flow is achieved. In a preferred arrangement the corresponding tubular contacting units on successive trays are in vertical alignment, whereby the gas flow through a series of trays is in an essentially straight path. The liquid passageway may be formed at least partly by liquid supply ducts situated within the preferred tubular contacting units, as described above; however, this aspect of the invention is not restricted to the use of contacting units having internal liquid supply ducts, and the passageway for liquid can be external with respect to the units, e.g., the liquid may descend through spaces between the contacting units, further defined if desired by vertical partitions.

Obviously, one of the key advantages of the invention relates to the internal location of the liquid supply conduit thereby making it possible to locate a greater number of tubular contacting apparatuses on a single tray than has heretofore been possible with conventional apparatus. The space to be kept between the tubular chambers can of course be adapted to the quantity of liquid to be processed.

The supply conduit may be in communication with the space located outside the tubular contacting chamber located on the next higher tray. It is possible, however, to pass the supply conduit through intermediate tubular chambers for communication with the space outside a tubular chamber located several trays above.

The invention permits a simple construction of columns, because the trays can be manufactured and assembled to the contacting units outside the column and later installed therein. In some operations one tubular contacting unit per tray may be sufficient, e.g., where only a small capacity is required. However, it is often attractive to place a plurality of contacting units on each tray. When the tubular contacting units are located at corresponding positions on successive trays, so that said apparatuses are in substantial vertical alignment with each other, the liquid discharged from one contacting apparatus can fall into the liquid inlet end of a supply conduit leading to another contacting apparatus placed below it. Further, as a result of such a preferred construction, it is possible for the gas leaving each contacting apparatus to reach another contacting apparatus placed above it with minimum flow resistance.

It is often advantageous that the connection of each liquid supply conduit with the relevant higher tray is located in the tubular wall near the supply end of a tubular contacting unit on that tray. This results in a simplification from the constructional point of view because the connection can be made before the tubular chamber has been mounted on the particular tray in question. The liquid which is present on the tray may then flow into the supply conduit through the opening in the wall and pass to a tubular chamber lying below. It may be advantageous to connect more than one opening in the said wall with one central supply conduit or, alternatively, to connect more than one opening in the said wall with an equal number of supply conduits, depending upon the quantity of liquid to be processed.

In order to prevent the liquid in the liquid supply conduit from being forced backwards by the upwardly flowing gas, it may be necessary to provide for a liquid seal in said supply conduit. For this purpose various known means can be utilized, such as a ring or cap extending over the inlet opening of the supply conduit or conduits. If the inlet connections of the supply conduits are located in the wall of a tubular contacting apparatus, it is attractive to form the liquid seal as an integral part of the liquid supply conduit, namely by bending the conduit in such a way that the underside of the bend is located at a higher level than the upper side of the connection with the wall. Consequently, a liquid seal is obtained without the use of extra component parts.

The invention will now be described with reference to the accompanying drawings wherein:

FIGURE 1 is a longitudinal section of a series of tubular contacting units, placed one above another on adjacent trays and having liquid supply conduits according to the invention;

FIGURE 2 is a cross-sectional view taken on the line 2—2 of FIGURE 1;

FIGURE 3 is a longitudinal section showing a modified embodiment of a tubular contacting apparatus according to the invention;

FIGURE 4 is a cross-sectional view taken on the line 4—4 of FIGURE 3;

FIGURE 5 is a longitudinal section showing a further modified embodiment of a tubular contacting apparatus according to the invention;

FIGURE 6 is a cross-sectional view taken on the line 6—6 of FIGURE 5;

FIGURE 7 is a cross-sectional view taken on the line 7—7 of FIGURE 5; and,

Figure 8:
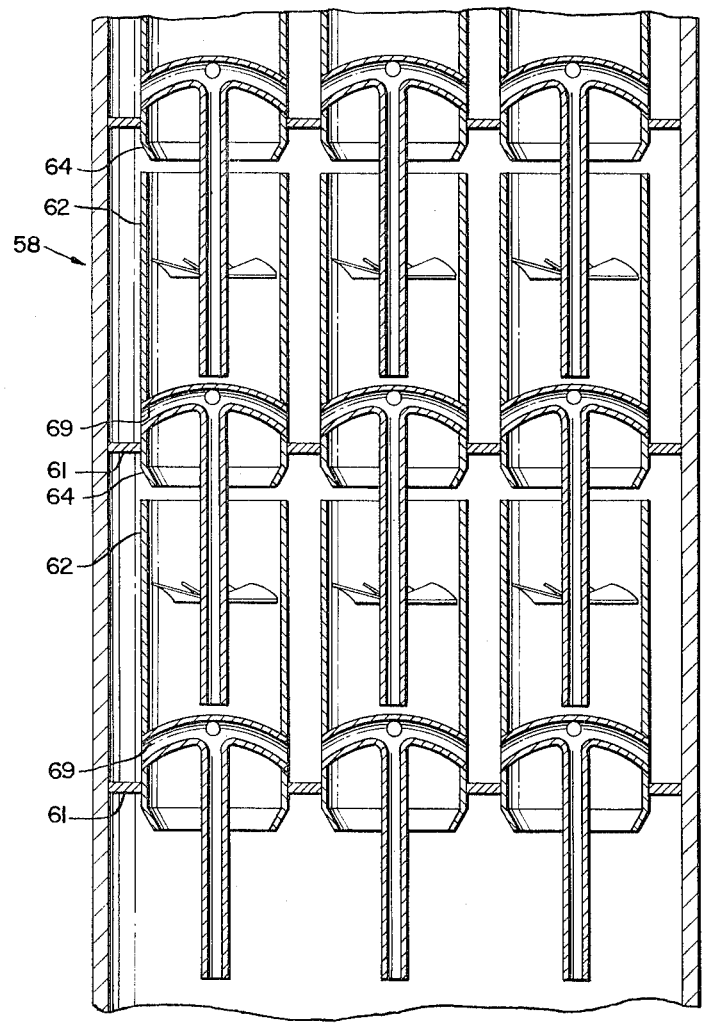
FIGURE 8 is a longitudinal section of part of a column built up of trays on which are placed a number of contacting units according to the invention.

Referring to FIGURES 1 and 2, there is shown a plurality of trays 11 having mounted thereon, at openings therein, elongated tubular wall members 12 which define contacting chambers 13. Upwardly flowing gas enters the chambers 13 through the lower openings 14 formed in the terminal ends of wall members 12, and liquid enters the chambers 13 through the discharge ends 15 of the supply conduits 16. Vane decks 17 are mounted on the external portions of the supply conduits 16 within each chamber 13 at a location above the discharge outlets 15. Between the vane decks 17 and the discharge openings 15 there may be provided means (not shown) for further atomizing the liquid, for instance a vane deck or projections or obstacles on the tubular wall for causing liquid drops to collect and causing the gas to re-entrain the liquid, thereby forming fresh droplets. An annular collar 18 is located on the lower side of each opening in the trays 11 and cooperates with the inwardly bent portions 14 of the wall member 12 to provide a means for catching the liquid separated in the respectively next lower chamber 13. This separated liquid is first caught and then falls downwardly outside of the tubular wall 12 to a tray 11 below. The liquid then passes into the supply conduit 16 via the opening 19 and passes to a contacting unit lying below.

In the embodiment shown in FIGURE 1, that contacting apparatus to which the liquid is passed is located two trays lower than the tray on which the liquid in question has collected; hence each unit contains two conduits 16. The conduit 16 may, however, discharge either into a contacting apparatus which is located still further below, or into the next lower one. In the particular embodiment of FIGURES 1 and 2 a radially inwardly extending annular collar 20 defines a drain space or trough about the internal periphery of the wall 12 within which the liquid discharged from the opening 15 collects and from which it later flows over the brim of the collar 20; is then blown upwardly by the gas flowing past it, being disrupted into small droplets. As shown, the underside of the bend 21 of the conduit 16 is at a higher level than the upper side of the opening 19, as a result of which a liquid seal is formed.

During operation, liquid admitted through the opening 15 in the supply conduit 16 passes first into the drain trough defined by collar 20 and then is blown upwardly into the chamber 13 and is carried along the tubular wall 12 by a gas stream which ascends through the opening 14 from any source, such as the next lower unit. As the liquid encounters the gas, liquid droplets are formed by gas entrainment, and any liquid coalescing on the interior of the wall 12 is re-entrained in the gas as fresh droplets having new surfaces. Thus, a sweeping and dispersal action is created within chamber 13 due to the gas velocity. As the gas flows through the vane deck 17 it is given a rotary motion about the vertical axis of the contacting chamber 13. This sets up centrifugal forces whereby the dispersed liquid droplets are flung outwardly to the wall 12, while being swept upward by the gas. The gas, largely denuded of liquid, escapes through the next higher opening 14, while the liquid moves outwardly over the brim of the tubular wall 12 where it is first caught inside the downwardly depending collar member 18 and subsequently drops downward to the next lower tray 11 after which it is carried away through the opening 19 of a supply conduit 16.

In the embodiment shown in FIGURES 3 and 4, 31 represents the trays, 32 the elongated tubular wall members defining the contacting chambers 33, 34 are the gas entry openings, and 36 represents the centrally located liquid supply conduits. As shown, the supply conduits 36 are connected at their upper ends with radial inlet tubes 39 that incline upwardly from inlet openings in the tubular wall members 32 and are symmetrically arranged around the circumference of said wall members. The discharge ends 35 of the supply conduits 36 are centrally located so that the liquid is discharged directly onto a small panel section 38, formed at the juncture of inlet tubes 39 with supply conduit 36 (see FIGURE 4), after which it is swept upwardly by the gas stream to the vane deck 37. This leads to a somewhat simpler internal construction of the contacting chambers since it eliminates the need for a drain collar such as shown at 20 in FIGURE 1. It is to be understood that annular collars such as shown at 18 in FIGURE 1 could also be utilized in this embodiment for the purpose of catching the liquid separated in the respective chambers 33.

Referring now to FIGURES 5, 6 and 7, 41 represents the trays, 42 the elongated tubular wall defining a contacting chamber 43 having located therein a vane deck 47, 44 is the gas entry opening, and 46 represents the liquid supply conduit. As shown, the supply conduit 46 terminates in a plurality of radially extending discharge branches 52 having downwardly extending nozzle sections 53 which are provided with small discharge outlets 45 located on the sides of said nozzles 53 facing the tubular wall 42. Such an arrangement leads to increased atomization of the liquid as it is discharged from the openings 45 towards the wall 42 and is thereafter swept upwardly by the gas flow towards the vane deck 47. In this particular embodiment, the liquid seal about the inlet opening 49 of the liquid supply conduit 46 is formed by constructing a hood or ringed section 55 about said opening as shown in FIGURE 5.

FIGURE 8 illustrates a longitudinal section of a generally circular cylindrical column 58. Mounted at different levels throughout the height of column 58 is a plurality of horizontal trays 61. Each of the trays 61 is provided with a plurality of gas-liquid contacting units 62. The contacting units 62, which are illustrated as constructed according to the embodiment of FIGURES 3 and 4, occupy corresponding positions on each of the trays 61 so as to be in vertical alignment with each other throughout the height of the column 58. This facilitates the ease of gas flow upwardly through a plurality of such contacting devices. Also, as shown, the separated liquid is deflected outwardly from the top of each contacting device 62 by means of the inwardly bent terminal portion 64 where said deflected separated liquid first contacts the underside of a tray located above and then falls downwardly to a lower tray. After reaching a lower tray 61 the liquid then enters another contacting device through one of the openings 69.

We claim as our invention:

1. Apparatus for effecting contact of gas and liquid which comprises:
   (a) a hollow, vertical column;
   (b) a plurality of horizontal trays mounted within said column at vertically spaced locations, each tray having a plurality of openings in vertically adjacent trays; and
   (c) a corresponding plurality of contacting units mounted at each said tray opening, each contacting unit to form a part of a corresponding plurality of vertical series of contacting units, each unit including:
      (1) a vertically elongated tubular chamber bounded by a substantially cylindrical confining sidewall of substantially the same diameter as that of said other chambers and open at the top and bottom, each said chamber being in vertical alignment with another chamber and in close proximity thereto for the direct flow of gas from a lower chamber into the next higher chamber without change in flow direction, and having a downwardly convergent, frusto-conical portion at the bottom thereof forming a gas-entrance of reduced area;
      (2) means for admitting a gas into a lower chamber of said series for upward flow through the chambers of the series;
      (3) liquid supply means including a tube situated centrally within each said chamber for flowing liquid downwardly and discharging it from a lateral extension on the lower end of said tube into an annular trough adjoining said confining wall in a liquid supply zone at a lower level of the respective chamber for entrainment by said gas at said zone, said annular trough providing a central space within said zone for the flow of gas therethrough;
      (4) whirl means within each said chamber situated above the said liquid supply zone thereof for imparting whirling motion to the ascending mixture of gas and entrained liquid and hurling liquid against said confining wall; and
      (5) liquid discharge means at an upper level of each said chamber for discharging the liquid from said confining wall including an opening in an upper part of said confining wall which is in free-flow communication with the space above said contacting unit mounting tray, said space being common to the several units mounted on said tray, and an annular collar of greater internal diameter than the top of each contacting chamber adjacent said opening and depending from the tray next above the respective units for guiding the flow of the discharged liquid, said discharge means being in flow communication with the upper end of a central liquid supply tube which discharges liquid to the supply zone of a lower contacting unit, said upper end of said central liquid supply tube of said lower contacting unit extending upward into said higher unit and into liquid-receiving communication with said space above said higher contacting unit mounting tray through an opening in a lower part of the confining wall of said higher unit to receive liquid that accumulates on said higher tray.

2. Apparatus as defined in claim 1 wherein said lower end of said central tube is in free communication with the gas in the respective chamber in the vicinity of said liquid supply zone and said upper end of said central liquid supply tube extends bodily to a level above the highest level of said openings in the lower part of said confining wall of said higher unit that receives accumulated liquid on said higher tray for providing a liquid seal between said space above said higher tray and the centrally located portion of said tube.

3. Apparatus for effecting contact of gas and liquid which comprises:
   (a) a hollow, vertical column;
   (b) a plurality of horizontal trays mounted within said column at vertically spaced locations, each tray having a plurality of openings therein aligned vertically with a corresponding plurality of openings in vertically adjacent trays; and
   (c) a corresponding plurality of contacting units mounted at each said tray opening, each contacting unit to form a part of a corresponding plurality of vertical series of contacting units, each unit including:
      (1) a vertically elongated tubular chamber bounded by a substantially cylindrical confining sidewall of substantially the same diameter as that of said other chambers and open at the top and bottom, each said chamber being in vertical alignment with another chamber and in close proximity thereto for the direct flow of gas from a lower chamber into a next higher chamber without change in flow direction, and having a downwardly convergent frusto-conical portion at the bottom thereof forming a gas-entrance of reduced area;
      (2) means for admitting a gas into a lower chamber of said series for upward flow through the chambers of the series;
      (3) liquid supply means including a tube situated centrally within each said chamber for flowing liquid downwardly and discharging it into a liquid supply zone at a lower level of the respective chamber for entrainment by said gas at said zone;
      (4) whirl means within each said chamber situated above the said liquid supply zone thereof for imparting whirling motion to the ascending mixture of gas and entrained liquid and hurling liquid against said confining wall;
      (5) liquid discharge means at an upper level of each said chamber for discharging the liquid from said confining wall including an opening in an upper part of said confining wall which is in free-flow communication with the space above said contacting unit mounting tray, said space being common to the several units mounted on said tray, said discharge means being in flow communication with the upper end of a central liquid supply tube which discharges liquid to the supply zone of a lower contacting unit, said upper end of said central liquid tube of said lower contacting unit extending upward into said higher unit and into liquid-receiving communication with said space above said higher contacting unit mounting tray through the junction of a plurality of liquid supply ducts that extend from openings in the confining wall of said higher unit to receive liquid that accumulates on said trays; and
      (6) a panel at the liquid supply zone of said chamber being the top of said junction of said plurality of liquid supply ducts having an upwardly extending surface situated centrally with respect to said chamber and spaced from said confining wall to provide gas-flow spaces between the panel and said wall on opposed sides of said panel, the lower part of said central tube being positioned to discharge liquid onto the said surface.

4. Apparatus for effecting contact of gas and liquid which comprises:

(a) a hollow, vertical column;

(b) a plurality of horizontal trays mounted within said column at vertically spaced locations, each tray having a plurality of openings therein aligned vertically with a corresponding plurality of openings in vertically adjacent trays; and (c) a corresponding plurality of contacting units mounted at each said tray opening, each contacting unit to form a part of a corresponding plurality of vertical series of contacting units, each unit including:

(1) a vertically elongated tubular chamber bounded by a confining side wall and open at the top and bottom, each said chamber being in vertical alignment with another chamber and in close proximity thereto for the direct flow of gas from a lower chamber into the next higher chamber without change in flow direction;

(2) means for admitting a gas into a lower chamber of said series for upward flow through the chambers of the series;

(3) liquid supply means including a tube situated centrally within each said chamber for flowing liquid downwardly and discharging it into a liquid supply zone at a lower level of the respective chamber for entrainment by said gas at said zone, said central tube including, at a level above the said liquid supply zone, a plurality of discharge branches extending radially outwardly from said tube to close proximity with said confining wall, each of said branches having a liquid discharge opening directed towards the said confining wall to direct liquid against said wall;

(4) whirl means within each said chamber situated above the said liquid supply zone thereof for imparting whirling motion to the ascending mixture of gas and entrained liquid and hurling liquid against said confining wall; and (5) liquid discharge means at an upper level of each said chamber for discharging the liquid from said confining wall including an opening in an upper part of said confining wall which is in free-flow communication with the space above said contacting unit mounting tray, said space being common to the several units mounted on said tray, said discharge means being in flow communication with the upper end of a central liquid supply tube which discharges liquid to the supply zone of a lower contacting unit, said upper end of said central liquid supply tube of said lower contacting unit extending upward into said higher unit and into liquid-receiving communication with said space above said higher contacting unit mounting tray through an opening in a lower part of the confining wall of said higher unit to receive liquid that accumulates on said higher tray.

References Cited by the Examiner

UNITED STATES PATENTS

| | | |
|---|---|---|
| 1,121,868 | 12/1914 | Riotte et al. |
| 1,846,248 | 2/1932 | Clarke. |
| 2,210,808 | 8/1940 | Glitsch. |
| 2,560,077 | 7/1951 | Bloomer et al. _____ 261—114 X |
| 2,808,897 | 10/1957 | Reinsch et al. _____ 55—238 |
| 2,847,200 | 8/1958 | Ung _____ 261—114 X |
| 3,248,860 | 5/1966 | Carlson _____ 55—257 X |

FOREIGN PATENTS

| | | |
|---|---|---|
| 550,465 | 12/1957 | Canada. |
| 1,088,765 | 10/1953 | France. |
| 1,368,015 | 9/1963 | France. |

HARRY B. THORNTON, *Primary Examiner.*

ROBERT F. BURNETT, *Examiner.*

D. K. DENENBERG, D. TALBERT,
*Assistant Examiners.*